United States Patent [19]

Ueda

[11] 4,075,848
[45] Feb. 28, 1978

[54] HYDRAULIC BRAKE BOOSTER
[75] Inventor: Atsumi Ueda, Toyota, Japan
[73] Assignee: Aisin Seiki Kabushiki Kaisha, Japan
[21] Appl. No.: 656,072
[22] Filed: Feb. 6, 1976
[30] Foreign Application Priority Data
  Feb. 7, 1975  Japan ................................. 50-16527
[51] Int. Cl.² ........................................... B60T 13/12
[52] U.S. Cl. ......................................... 60/548; 60/553;
    60/582; 91/31; 91/370; 91/412
[58] Field of Search ................. 60/547, 582, 548, 553,
    60/593; 91/370, 31, 6, 412

[56] References Cited
U.S. PATENT DOCUMENTS

| 3,677,007 | 7/1972 | Goscenski | 60/582 |
| 3,712,057 | 1/1973 | Aiki | 60/547 |
| 3,898,809 | 8/1975 | Baker | 91/28 |
| 3,899,889 | 8/1975 | Swanson | 60/547 |
| 3,926,093 | 12/1975 | Nakagawa | 60/547 |

Primary Examiner—Martin P. Schwadron
Assistant Examiner—Abraham Hershkovitz
Attorney, Agent, or Firm—Oblon, Fisher, Spivak, McClelland & Maier

[57] ABSTRACT

A hydraulic brake booster of the type utilizing pressurized fluid supplied to a hydraulic power steering device, wherein a flow regulating valve is adapted to rapidly increase the pressure in a power chamber of the booster in response to actuation of the booster and another flow regulating valve is adapted to ensure supply of the pressurized fluid to the power steering device, and wherein an accumulator is adapted to surely operate the booster even when pressure supply to the power chamber from the fluid pressure source is accidentally blocked or stopped.

7 Claims, 6 Drawing Figures

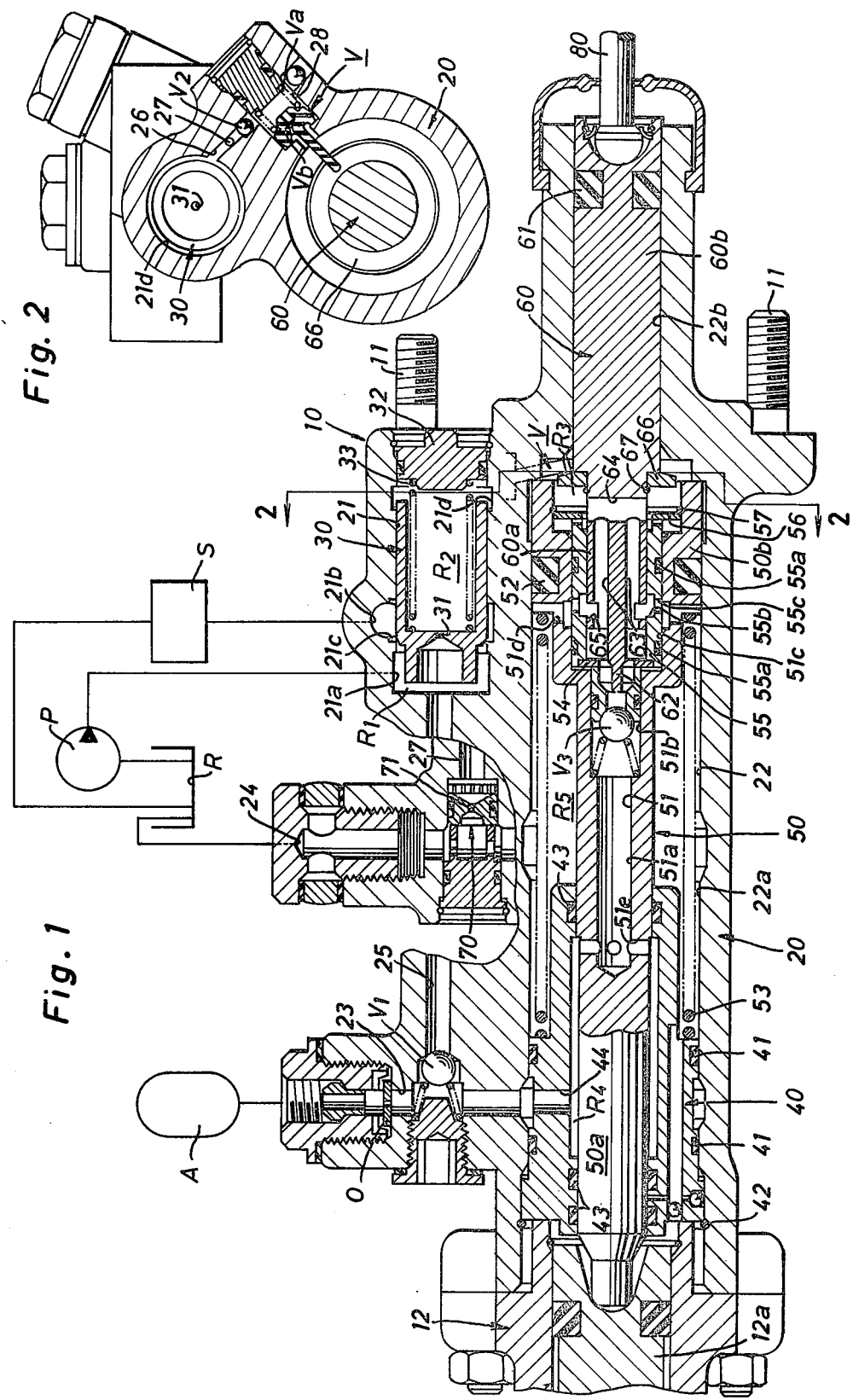

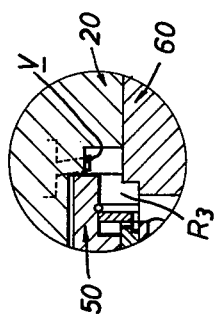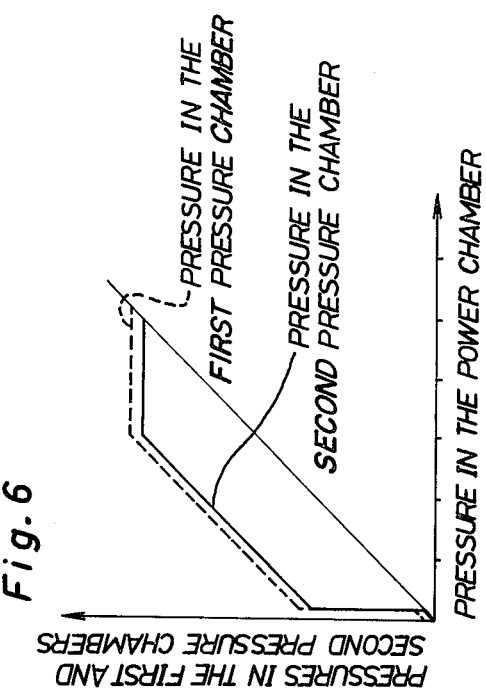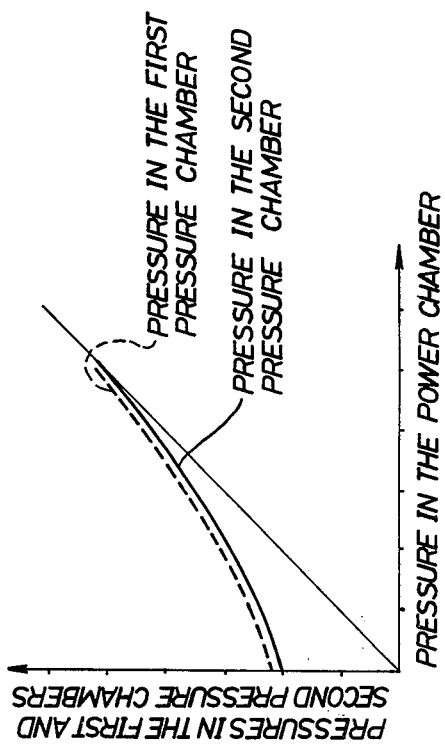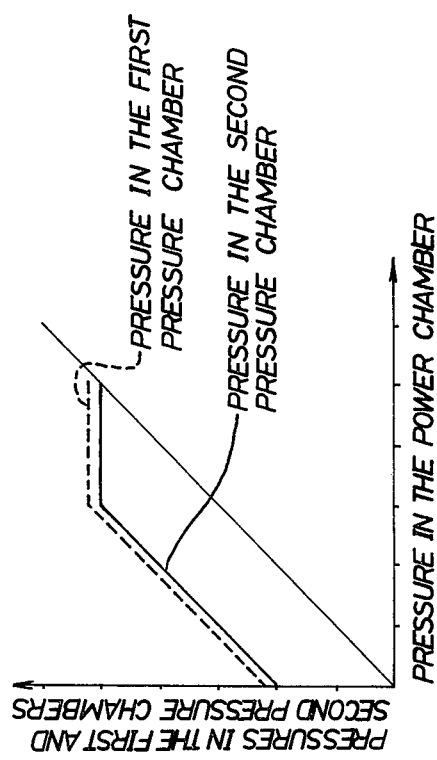

ized fluid supplied to a hydraulically operated device such as a power steering device and the like.

SUMMARY OF THE INVENTION

It is an object of the present invention to provide a hydraulic brake booster wherein pressure in a power chamber of the booster is rapidly increased in response to the braking operation and not affected by pulsing operation of a fluid pump as a fluid pressure source.

It is another object of the present invention to provide a hydraulic brake booster, having the above-mentioned characteristics, wherein a flow regulating means is adapted to ensure supply of operation fluid to other hydraulically operated device such as a power steering device.

It is still another object of the present invention to provide a hydraulic brake booster, having the above-mentioned characteristics, wherein an accumulator is adapted to surely conduct the braking operation even when pressure supply to the power chamber from the fluid pump is accidentally blocked or stopped.

It is a further object of the present invention to provide a hydraulic brake booster, having the above-mentioned characteristics, wherein pressure for use by the brake booster is constantly stored in the accumulator to increase the safety feature of the booster.

BRIEF DESCRIPTION OF THE DRAWINGS

The foregoing and various other objects, features and attendant advantages of the present invention will be more fully appreciated as the same becomes better understood from the following description especially when considered in conjunction with the accompanying drawings in which:

FIG. 1 is a side view of an elevational cross-section of a brake booster in accordance with the present invention;

FIG. 2 is a vertical cross-section view of the brake booster taken along the line 2 — 2 of FIG. 1;

FIG. 3 is a graphic chart illustrating certain operating characteristics of the brake booster;

FIG. 4 is a graphic chart illustrating certain operating characteristics of a modification of the present invention, wherein a relief valve is adapted as a flow regulating means;

FIG. 5 shows a partial cross-section similar to FIG. 1 of another embodiment of the present invention; and FIG. 6 is a graphic chart illustrating certain operating characteristics of the embodiment of FIG. 5.

DESCRIPTION OF THE PREFERRED EMBODIMENTS

Referring to the drawings, particularly to FIG. 1, a hydraulic brake booster 10 in accordance with the present invention is disposed in a hydraulic circuit connecting a hydraulic power steering device S to a fluid pump P driven by the prime engine of a vehicle. The brake booster 10 is mounted by stud bolts 11, 11 in a conventional manner within the engine compartment of the vehicle. A conventional brake master cylinder 12 is attached to the left end of the booster.

The brake booster 10 comprises a housing 20 which is provided with a cylindrical bore 21 including a control spool 30 therein and with a stepped cylindrical bore 22 including a sleeve member 40, a power piston 50 and a control piston 60 therein. The housing 20 is provided with an inlet port 21a and an outlet port 21b which are in communication with the cylindrical bore 21 and further provided with a subport 23 and a drain port 24 which are in communication with the stepped cylindrical bore 22. The sub-port 23 is connected to an accumulator A through a one-way orifice means O.

The cylindrical bore 21 is arranged in parallel with the stepped cylindrical bore 22 and formed therein are a first pressure chamber $R_1$ and a second pressure chamber $R_2$ by means of the control spool 30. The first pressure chamber $R_1$ communicates with the fluid pump P through the inlet port 21a and with the power steering device S through an annular groove 21c provided in the bore 21 and the outlet port 21b and further with the sub-port 23 by way of a main passage 25 and a check valve assembly $V_1$. The second pressure chamber $R_2$ communicates with the first pressure chamber $R_1$ through an orifice 31 provided at the axial center of the spool 30 and with the reservoir R through an annular groove 21d provided at the right end of the bore 21, passages 26 and 27 (see FIG. 2), a pressure controller 70 and the drain port 24 and further with a power chamber $R_3$ formed at the stepped portion of the stepped cylindrical bore 22 by way of the passage 26, a check valve $V_2$, a passage 28 and a control valve assembly V.

The control spool 30 is reciprocably engaged within the cylindrical bore 21 and normally urged leftward by a coil spring 33 acting between a shoulder of the spool 30 and a plug element 32 fluid-tightly threaded into the bore 21. The control spool 30 is moved leftward or rightward in response to pressure difference produced between the first and second pressure chambers $R_1$ and $R_2$ thereby to throttle either of the annular grooves 21c or 21d so as to maintain the pressure difference between the two chambers $R_1$ and $R_2$ at a predetermined value. Thus, the control spool 30 permits a predetermined small quantity out of pressurized fluid supplied from the pump P to flow into the power chamber $R_3$ through the second pressure chamber $R_2$ and the remaining quantity to flow into the power steering device S through the annular groove 21c and the outlet port 21b.

The sleeve member 40 is engaged within the left end of a large diameter portion 22a of the stepped bore 22 by way of a pair of annular seals 41, 41 and fixed by a snap ring 42. Within a longitudinal bore of the sleeve member 40, a small diameter portion 50a of the power piston 50 is slidably received by three annular seals 43. The enlarged portion of the bore within the sleeve member 40 forms an annular chamber $R_4$ around the small diameter portion 50a of the power piston 50. The annular chamber $R_4$ is connected to the sub-port 23 across a radial passage 44.

The power piston 50 has a large diameter portion 50b reciprocably engaged within the large diameter portion 22a of the stepped cylindrical bore 22 by way of an annular seal 52 and is normally urged rightward by a return coil spring 53 acting between a shoulder of the sleeve member 40 and a shoulder of the power piston 50. The left end of the power piston 50 is received by a primary piston 12a of the brake master cylinder 12. The power chamber $R_3$ is formed at the right side of the power piston 50 and a drain chamber $R_5$ is formed at the left side of the power piston 50. The drain chamber $R_5$ is in communication with the reservoir R through the drain port 24. The axial center of the power piston 50 is formed with a three stepped bore 51 including a small diameter bore 51a, a medium diameter bore 51b and a large diameter bore 51c. In the medium diameter bore 51b, a check valve assembly $V_3$ is fixed by an annular retainer 54 and in the large diameter bore 51c, a tubular member 55 is fixedly engaged by an annular retainer 56 and a snap ring 57. The tubular member 55 is engaged within the power piston 50 by way of a pair of annular seals 55a and the interior thereof is connected to the drain chamber $R_5$ through an annular groove 55b, radial passages 55c and 51d. The radial passage 55c is drilled through the tubular member 55 and the radial passage 51d is drilled through the power piston 50. The small diameter bore 51a is connected at the left end thereof to the annular chamber $R_4$ by way of radial passages 51e.

The control piston 60 comprises a small diameter portion 60a and a large diameter portion 60b which are respectively reciprocable within the tubular member 55 and within a small diameter bore 22b of the stepped cylindrical bore 22 by way of an annular seal 61. At the right end of the control piston 60, is connected a push rod 80 operatively connected to a brake pedal (not shown in the figure) and at the small diameter portion 60a, is provided an extension 62 extending into the medium diameter bore 51b of the power piston 50. Axial passages 63 and a radial passage 64 are provided through the small diameter portion 60a of the control piston 60 to communicate the interior of the tubular member 55 with the power chamber $R_3$. An annular groove 65 is also provided at the small diameter portion 60a so as to communicate the axial passages 63 with the annular groove 55b of the tubular member 55. At the stepped portion of the control piston 60, an annular control plate 66 is fixed by a snap ring 67 to maintain the control valve assembly V open while the control piston 60 is in an unapplied or brake released condition. As well shown in FIG. 2, the control valve assembly V includes a mushroom shaped valve body which is normally biased radially inward by a coil spring Va and provided with an orifice Vb of a predeterminded diameter at the head portion thereof.

Hereinafter, operation of the hydraulic brake booster 10 will be described in detail. While the brake booster 10 and the power steering device S are in an inoperative condition, hydraulic fluid supplied to the first pressure chamber $R_1$ from the pump P through the inlet port 21a flows into the steering device S by way of the annular groove 21c and the outlet port 21b and then returns to the reservoir R. Simultaneously, a certain amount of the hydraulic fluid flows into the second pressure chamber $R_2$ through the orifice 31 of the control spool 30. The supplied fluid in the second pressure chamber $R_2$ is then difurcated into the power chamber $R_3$ through the annular groove 21d, the passage 26, the check valve $V_2$, the passage 28 and the control valve assembly V and into the reservoir R by way of the passage 26, the bypass passage 27, the pressure controller 70 and the drain port 24. The supplied fluid in the power chamber $R_3$ flows into the drain chamber $R_5$ through the passages 64, 63 and the annular groove 65 of the control piston 60, the annular groove 55b and the radial passage 55c of the tubular member 55, and the radial passage 51d of the power piston 50, and then returns to the reservoir R through the drain port 24. Under this condition, the pressure given to the first pressure chamber $R_1$ is rather in a low value and the flow of fluid in the main passage 25 is regulated by the check valve assembly $V_1$.

When a brake application is made under a condition when no steering correction is being made, depression of the brake pedal causes a leftward movement of the control piston 60 by way of the push rod 80. This leftward movement of the control piston 60 separates the control valve V from the control plate 66 to close the valve V. Subsequently, the annular groove 55b of the tubular member 55 is closed with the small diameter portion 60a of the control piston 60 and, in turn, the extension 62 of the piston 60 opens the check valve $V_3$. After closure of the control valve V, the flow quantity of fluid from the second pressure chamber $R_2$ to the power chamber $R_3$ is restricted by the orifice Vb of the control valve V, thereby to increase the pressure in the passage 28 and then in the second pressure chamber $R_2$. The increase in pressure in the second pressure chamber $R_2$ will cause a leftward movement of the control spool 30 to throttle the annular groove 21c, which rapidly increases the pressure in the first pressure chamber $R_1$. As a result, the fluid flow quantity passing through the orifice 31 of the spool 30 is maintained in a predetermined value. Under this condition, the increased pressure in the first pressure chamber $R_1$ is stored in the accumulator A through the check valve $V_1$ and the one-way orifice O. At the same time, the opening of the check valve $V_3$ within the power piston 50 permits the pressurized fluid in the first pressure chamber $R_1$ or in the accumulator A to flow in a large quantity into the power chamber $R_3$ wherein the pressure is rapidly increased. This increased pressure in the power chamber $R_3$ moves the power piston 50 leftward to cause a leftward movement of the primary piston 12a of the brake master cylinder 12 so as to produce braking force.

In the above-mentioned operation, the pressure in the power chamber $R_3$ gives a counter force to the control piston 60 which is thus moved rightward. When the pressure in the power chamber $R_3$ reaches the one corresponding to the depressing force applied to the brake pedal, the extension 62 of the control piston 60 leaves the check valve $V_3$ which is then closed. After closure of the check valve $V_3$, the power chamber $R_3$ is supplied with the pressure only through the orifice Vb of the control valve V. Thus, there is produced little pressure changes in the power chamber $R_3$ by pulsing operation of the pump P. Thereafter, pressure control in the power chamber $R_3$ is conducted by the control piston 60 adjusting the fluid flow from the annular groove 55b of the tubular member 55 to the drain chamber $R_5$. Under this condition, further depression applied to the brake pedal causes a leftward movement of the control piston 60 so that, as seen in FIG. 3, the pressure in the power chamber $R_3$ is increased and subsequently the pressures in the first and second pressure chambers $R_1$ and $R_2$ are increased respectively up to the predetermined values. In this braking operation, due to the increase in pressure in the second pressure chamber $R_2$, a portion of the pressure in the second pressure chamber $R_2$ returns to the reservoir R through the bypass passage 27 and the orifice 71 of the pressure controller 70.

Furthermore, when the pressure in the power chamber $R_3$ reaches a predetermined high value, as shown in FIG. 3, during the mentioned operation, all of the pressurized fluid passing through the orifice 31 in the predetermined constant quantity returns to the reservoir R through the bypass passage 27 and the orifice 71 of the pressure controller 70. Thus, the pressure in the power chamber $R_3$ never exceeds the predetermined value and the control spool 30 never closes completely the annular groove 21c. As a result, the power steering device S is supplied with the necessary quantity of fluid from the first pressure chamber $R_1$ in the above operation.

Moreover, when the braking operation is conducted under a condition when steering correction is made, the above-mentioned operation of the brake booster 10 is conducted under a condition that the pressure in the first pressure chamber $R_1$ increases by a predetermined value.

Under such an undesired condition that no pressure is supplied to the first pressure chamber $R_1$ due to a trouble with the fluid pump P, the pressure in the accumulator A is supplied into the power chamber $R_3$ upon opening of the check valve $V_3$ so that the pressure in the power chamber $R_3$ is surely increased. In this instance, the flow of fluid from the power chamber $R_3$ to the second pressure chamber $R_2$ is blocked by the check valve $V_2$, thereby to ensure the braking operation.

In the above-mentioned embodiment, the orifice 71 is adapted for the pressure controller 70 to ensure the flow of fluid supplied to the power steering device S. This orifice 71 may be replaced with a relief valve to be opened at a predetermined pressure level. The operation of this instance is indicated in FIG. 4.

FIG. 5 illustrates a modification of the present invention, wherein the control valve V is assembled to be operated by the power piston 50. In operation of this modification, when the pressure in the power chamber $R_3$ is increased in response to leftward movement of the control piston 60, the power piston 50 is swiftly moved leftward and the control valve V is closed. After closure of the control valve V, the pressure in the second pressure chamber $R_2$ is increased due to throttling effect of the control valve V and, in turn, the pressure in the first pressure chamber $R_1$ is increased as shown in FIG. 6. All other operation is substantially the same as those of the above-mentioned embodiment.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In combination with a hydraulic brake booster for a vehicle having a brake activating means, a master cylinder for supplying pressure to the wheel cylinders of the vehicle, a hydraulic circuit for circulating pressurized fluid from a fluid pressure source to a reservoir by way of a hydraulic power control device comprising:
    a housing for interposition within said hydraulic circuit between said pressure source and said power control device said housing being provided therein with a cylindrical bore and thereon with an inlet port, an outlet port and a drain port respectively in communication with said pressure source, said power control device and said reservoir;
    a power piston reciprocable within said cylindrical bore of said housing for forming at one side thereof a power chamber and at the other side thereof a drain chamber in communication with said drain port, said power piston being operatively connectible at one end thereof with said master cylinder and being provided therein with a bore opening toward said power chamber;
    a control piston reciprocable within said bores of said housing and said power piston to control interconnection between said power chamber and said drain chamber, said control piston being operatively connectible to said brake activating means;
    a first passage means for connecting said inlet port to said power chamber through said bore of said power piston;
    a control means for selectively closing and opening the interconnection between said power chamber and said drain chamber in response to movement of said control piston; and
    means disposed within said first passage means for closing the communication between said power chamber and said inlet port when said power chamber is communicated with said drain chamber and opening the communication between said power chamber and said inlet port when said power chamber is isolated from said drain chamber by means of said control means;
    the improvement which comprises
    a second passage means for connecting said inlet port with said power chamber independently of said first passage means;
    a first flow regulating means disposed within said second passage means for throttling the flow of fluid supplied from said inlet port to said power chamber when said power chamber is isolated from said drain chamber by means of said control means in response to movement of said control piston; and
    a second flow regulating means disposed within said second passage means between said inlet port and said first flow regulating means for controlling the flow of fluid from said inlet port to said outlet port and the flow of fluid from said inlet port to said power chamber through said first flow regulating means.

2. A hydraulic brake booster as claimed in claim 1, wherein said first flow regulating means comprises
    a valve means for throttling the flow of fluid supplied from said inlet port to said power chamber through said second flow regulating means when said power chamber is isolated from said drain chamber by means of said control means, the action of said valve means being controlled by movement of said control piston; and
    a check valve means for permitting the flow of fluid supplied from said inlet port to said power chamber through said second flow regulating means and blocking the flow of fluid from said power chamber to said inlet port through said second flow regulating means.

3. A hydraulic brake booster as claimed in claim 1, wherein said first flow regulating means comprises
    a valve means for throttling the flow of fluid supplied from said inlet port to said power chamber through said second flow regulating means when said power chamber is isolated from said drain chamber by means of said control means, the action of said valve means being controlled by movement of said power piston; and
    a check valve means for permitting the flow of fluid supplied from said inlet port to said power chamber through said second flow regulating means and blocking the flow of fluid from said power chamber to said inlet port through said second flow regulating means.

4. A hydraulic brake booster as claimed in claim 1, further comprising:
   a third passage means for connecting said drain port to said second passage means between said first and second flow regulating means; and
   a third flow regulating means disposed within said third passage means for hydraulically controlling the action of said second flow regulating means.

5. A hydraulic brake booster as claimed in claim 4, wherein said third flow regulating means includes an orifice means to regulate the pressure between said first and second flow regulating means.

6. A hydraulic brake booster as claimed in claim 4, wherein said third flow regulating means includes a relief valve to regulate the pressure between said first and second flow regulating means.

7. A hydraulic brake booster as claimed in claim 1, wherein said housing is further provided thereon with a port connected to said first passage means between said inlet port and said means for opening and closing said communication between said power chamber and said inlet port and an accumulator is connected to said port to store pressure applied from said inlet port therein.

* * * * *